INVENTOR.
Herbert L. Magill
BY
Att'ys

Patented June 19, 1951

2,557,128

UNITED STATES PATENT OFFICE 2,557,128

PULSATING DISCHARGE POWER GAS GENERATOR WITH PRESSURE-ACTUATED INLET AND OUTLET VALVES

Herbert L. Magill, Chicago, Ill.

Application January 29, 1945, Serial No. 575,158

37 Claims. (Cl. 60—44)

My invention relates to power generators of the internal combustion type for converting fuel into gas under high pressure and at high temperature as a source of power and/or heat. While the invention is applicable widely in various fields for various specific purposes, it is of special utility for jet or reaction propulsion of aircraft. For the purpose of present disclosure, I elect to describe the invention as applied to aircraft and it will be apparent that such description will provide adequate guidance for those skilled in the art desiring to use the invention for other purposes.

The general object of my invention is to provide a highly efficient and reliable internal combustion gas generator that is relatively simple in construction and flexible in operation.

One of my objects is to provide an internal combustion gas generator that will inherently maintain a constant high level of efficiency over a wide range of power output. In most internal combustion power plants, such as the various well-known types of internal combustion engines, changes in speed of operation or power output are accomplished by such expedients as varying the quantity of the fuel charge or the amount of fuel injected on a power cycle, all of which expedients affect the thermal efficiency of the power plant.

It is proposed in the present invention to operate with optimum combustion at all times, regardless of changes in speed and power. This object is attained in general by providing automatic means for producing substantially uniform and constant fuel charges of substantially uniform pressure under all operating conditions and varying the speed or power output by varying the frequency at which the charges are produced and ignited.

It is an object of the invention also to provide simple and highly flexible means for controlling the power output through variation of the combustion cycles. In this regard, a feature of the invention is that this object of controlling frequency may be accomplished simply by employing a variable fuel feed valve or throttle in combination with the above-mentioned means for producing uniform fuel charges. Thus varying the rate of fuel feed varies the periods of time required for the successive uniform fuel charges to accumulate in the generator so that the frequency of the combustion cycles is determined by the position of the throttle. In ordinary internal combustion engines, the fuel charges are not uniform, and the pressure within the cylinder varies with the fuel charge.

Another object of my invention is to provide a reliable but uncomplicated and structurally simple arrangement for automatically carrying out the cycle of steps including the forming of the supplied fuel into uniform charges confined under a given predetermined pressure, igniting the confined charges and releasing the resulting products of combustion.

In my preferred practices, I attain this latter object by a combination of pressure-responsive means including a pressure-responsive intake valve, a pressure-responsive exhaust valve and pressure-responsive means for timing the ignition or pressure increase of the confined charge. One of the specific objects in the preferred practices of my invention is to provide such automatic operation based on pressure-responsive control as distinguished from strictly mechanical and/or electrical timing control.

A problem in the operation of any internal combustion generator is to avoid excessive heat loss especially when cooling expedients are employed to avoid overheating the walls of the generator. This problem is, of course, acute in high temperature internal combustion generators of the present type. In this regard, a further object of the invention is to minimize such heat loss. This object is attained by enveloping the hotter parts of the generator by jacket means, by circulating a suitable cooling medium through the jacket means and, finally, by utilizing the heat and energy acquired by the cooling medium from the fuel combustion or heat released in the pressure chamber. In the preferred practice of my invention, the cooling medium is air and the heated air is finally mingled with the combustion discharge thereby returning the recovered heat to the power medium.

A specific object of the invention is to provide such a cooling arrangement with effective circulation of the cooling medium. A further important object is to provide a cooling system that may be readily adapted to long discharge ducts whereby the combustion output of a generator may be conveyed a substantial distance from the point of combustion with minimum penalty in heat loss.

With reference to use in aircraft, additional objects of the invention include the following: to provide an internal combustion power generation system, the efficiency of which is substantially constant over a great range in altitude and in which the efficiency is reduced by only a relatively small degree at altitudes above such range; to provide a novel and useful combination of internal combustion generator and compressed air supply means in which the generator cycle is controlled automatically in response to pressure and in which the compressed air supply means incorporates automatic means to compensate for changes in the altitude of an aircraft thereby to maintain the pressure relationships for the automatic action; to provide an internal combustion generator combined with a jet-driven propeller; and, in some practices of the invention, to provide a dirigible or articulated generator construction that may be used for aerodynamic control of an aircraft as well as power.

In certain practices of my invention, a further object in mind is to provide a multiple-generator unit in which a plurality of generators are correlated for directing their outputs into a common passage.

The above and other objects of my invention will be apparent in the following detailed description taken with the accompanying drawings.

In the drawings which are to be regarded as merely illustrative.

*General description*

Figure 1:
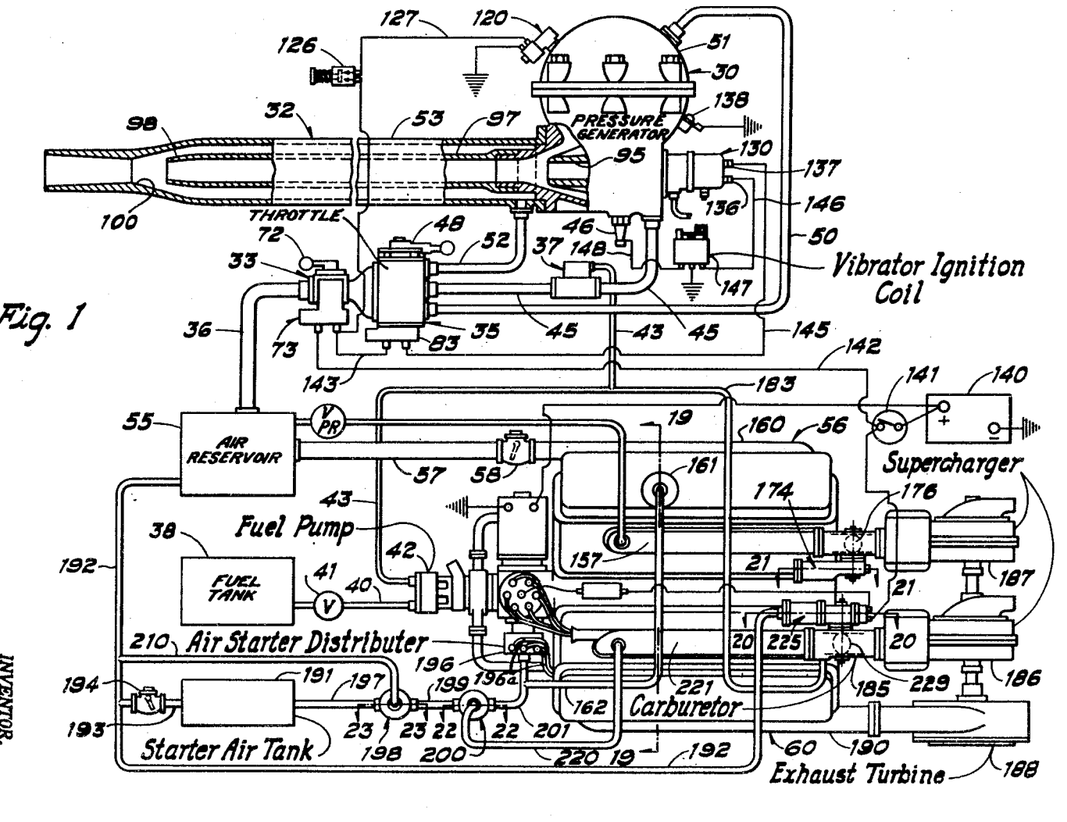
Figure 1 is a diagrammatic view partly in section of an internal combustion system incorporating the preferred form of my invention.

The system shown in Figure 1 includes an internal combustion generator having a combustion chamber, generally designated 30, and a discharge duct, generally designated 32. Under control of a suitable shutoff valve 33 and a suitable feed control valve or throttle valve 35, compressed air received from a suitable source through a supply pipe 36 is delivered to a carburetor 37 for mixture with a suitable fluid fuel. In the arrangement shown, fuel from a supply tank 38 reaches the carburetor 37 through a fuel line including a pipe 40, a shutoff valve 41, a suitable fuel pump 42 and a pipe 43.

The fuel mixture from the carburetor 37 is fed to the combustion chamber 30 through a feed pipe 45 under suitable pressure, say, at 150 pounds per square inch, to form successive fuel charges therein at substantially the same pressure. The successive charges are ignited by means including a suitable spark plug 46 and the products of combustion produced in the chamber 30 are discharged through a suitable inner combustion nozzle 95.

The desired cycle of intake, ignition and exhaust may be insured by various timing arrangements in various practices of my invention. A feature of the preferred practice exemplified by the drawings is the automatic timing in such a cycle by a combination of pressure-responsive means controlling both the intake port and the exhaust port of the combustion chamber 30 as well as energizing the spark plug 46.

Such a combination of pressure-responsive means causes the pressure generator to operate at constant volumetric efficiency, that is to say, ignites fuel mixtures within the combustion chamber 30 only when a predetermined mass fuel mixture is accumulated. Ignition follows automatically whenever sustained fuel flow to the combustion chamber results in the accumulation of a charge therein at a predetermined pressure. It is apparent that the frequency of explosions or combustion cycles depends upon the rate of the fuel supply, and therefore the frequency is controlled by positions of the control lever 48 of the throttle valve 35.

As will be described in detail hereinafter, air under control of the throttle valve 35 may also be used to cool both the combustion chamber 30 and the discharge duct 32, and, for this purpose, Figure 1 shows a pipe 50 from the throttle valve 35 to an air jacket 51 enclosing the combustion chamber 30, and a pipe 52 from the throttle valve to a jacket 53 enclosing the discharge duct 32.

The remainder of Figure 1 illustrates my preferred arrangement for delivering air to the supply pipe 36, and, incidentally, for operating the fuel pump 42. It is apparent that widely diverse arrangements can be employed for such purpose in various practices of the invention. The present arrangement is highly advantageous since it provides compressed air at constant or nearly constant pressure under varying operating conditions with special reference to the variations in altitude that must be met in aircraft operation. Minimum variation in the pressure of the air supply is of peculiar importance in the present system since the cycle of operation of the internal combustion generator responds to predetermined pressure relationships. It is apparent that the source of compressed air for the generator must provide substantial pressure at various levels of demand as well as at various altitudes of the aircraft.

In the particular arrangement shown in Figure 1, the above-mentioned supply pipe 36 is connected to a compressed air reservoir 55, which reservoir is supplied by a suitable compressor 56 through a pipe 57 having a check valve 58. The compressor 56 is driven by a suitable internal combustion engine 60, and is provided with what may be termed a barometric control device 174 to compensate for changes in air density with changes in altitude. The engine is controlled automatically for operating the compressor as required to maintain pressure in the reservoir 55 above a predetermined magnitude.

*Fuel control*

The explosive mixture for the internal combustion generator may be any combination of gaseous, liquid or solid fuel components adapted to mix with air for forming combustible charges. By way of example, the present system will be described as adapted for operation with a relatively volatile fuel, such as gasoline. The heretofore-mentioned feed pipe 45 constituting the fuel supply passage for the combustion chamber 30 is connected with the carburetor 37 in the manner shown in Figures 7 and 8.

Figures 7, 8, 11, 12, 18:
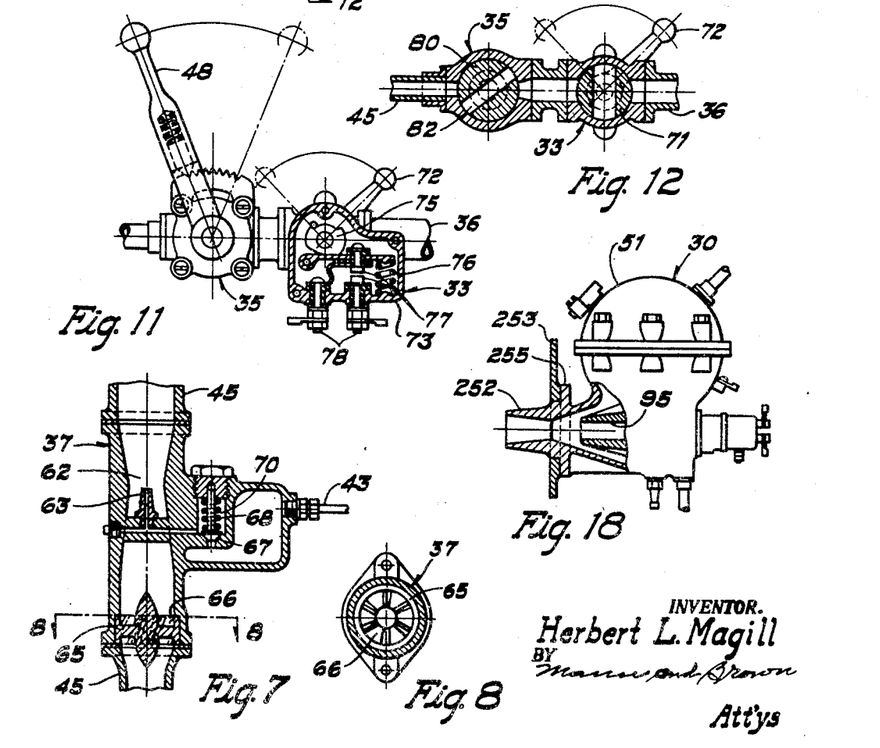
Figure 7 is a sectional view of a carburetor associated with the generator.
Figure 8 is a section taken as indicated by the line 8—8 of Figure 7.
Figures 10, 11 and 12 are sectional views taken as indicated, respectively, by the lines 10—10, 11—11 and 12—12 of Figure 9.
Figure 18 is a view partly in side elevation and partly in section showing how a simple form of my internal combustion generator may be employed as a heat source for generating steam and for other purposes.

The carburetor 37 is of any suitable type for use with compressed air, and in the particular form shown here has a Venturi throat 62 in which a fuel injection nozzle 63 is mounted on a spider in the usual manner. The air entering the Venturi throat 62 is formed into a vortex by a mixing device 65 having a series of inclined blades 66. Liquid fuel entering the carburetor through the pipe 43 must pass through a valve 67 in the carburetor, which valve is urged toward closed position in opposition to the fuel pressure by a suitable spring 68.

The fuel pressure created by the fuel pump 42 and the resistance to such pressure by the spring 68 are such that, in the absence of air flow through the Venturi throat 62, the valve 67 will remain closed to cut off fuel flow. When air flows through the air feed pipe 45, mixing device 65, and the Venturi throat 62, the pressure in the valve chamber 70 that cooperates with the spring 68 in holding the valve 67 closed is reduced to such an extent that the valve opens automatically. Thus the carburetor 37 operates automatically to admit fuel to the feed pipe 45 in response to air flow through the feed pipe and operates automatically to cut off fuel admission in response to cessation of the air flow.

As heretofore stated, the release of air from the supply pipe 36 is controlled by the shut-off valve 33 and the throttle valve 35. The construction of these two valves may be understood by referring to Figures 9–12 inclusive.

The shutoff valve 33, which is positioned ahead of the throttle valve and is normally open for operation of the system, has a cylindrical valve member 71 operated by a handle 72. An ignition switch 73 (Figures 9 and 11) may be incorporated in the construction of the shutoff valve 33 for the purpose of opening the ignition circuit when the valve is closed. In the present arrangement, a cam 75, best shown in Figure 11, acts against the opposition of a switch spring 76 to move two contacts 77 together whenever the valve member 71 is rotated to open position. The two contacts 77 are connected to two corresponding external terminal posts 78 in the ignition circuit.

Figures 9, 10:
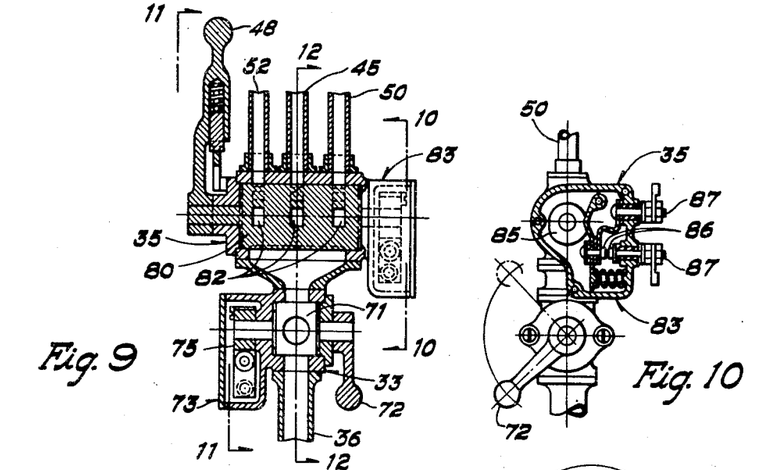
Figure 9 is a sectional view indicating the construction of a cutoff valve and a control valve or throttle for governing the operation of the generator.

The throttle valve 35 has a cylindrical valve member 80 controlled by a suitable handle or throttle 48. The cylindrical valve member 80 has three diametrical valve apertures 82 positioned to register, respectively, with outlet ports communicating with the three-mentioned pipes 45, 50 and 52 leading, respectively, to the combustion chamber 30 and the two previously-mentioned cooling jackets 51 and 53. Thus the position of the throttle 48 controls simultaneously the rate of air flow through the three pipes.

The throttle valve 35 may also have operatively associated therewith an ignition switch 83. As best shown in Figure 10, a cam 85 connected with the cylindrical valve member 80 is adapted to bring together two contacts 86 corresponding to two terminal posts 87 in the ignition system whenever the throttle valve enters the range of positions at which compressed air flows through the valve.

*Construction of pressure generator*

Figures 2, 2A, 3, 4, 5, 6:
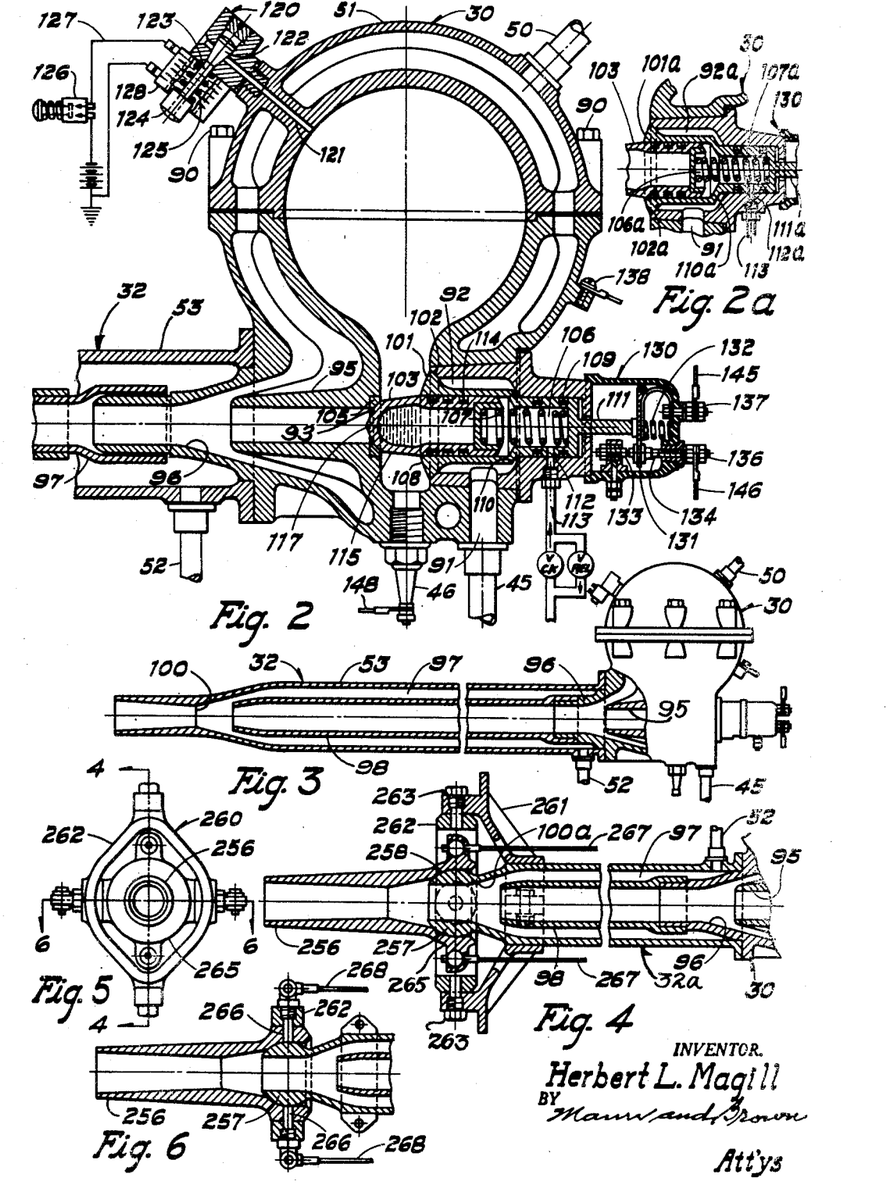
Figure 2 is an enlarged sectional view of the internal combustion generator employed in Figure 1.
Figure 2a is a sectional view of a modified form of inlet valve.
Figure 3 is a view corresponding to a portion of Figure 1, showing the generator employed in the system.
Figure 4 is a vertical section through the discharge end of what may be termed an articulated internal combustion generator constructed in accord with my invention, the section being taken as indicated by the line 4—4 of Figure 5.
Figure 5 is an end view of the articulated generator.
Figure 6 is a fragmentary horizontal section taken as indicated by the line 6—6 of Figure 5.

As shown in Figures 1 to 3, the combustion chamber 30 of the pressure generator may be made in two sections assembled together by suitable bolts 90. Preferably, the combustion chamber is of generally spherical configuration and is of double wall construction, the outer wall of which constitutes the previously-mentioned cooling jacket 51 into which air is introduced by the pipe 50. As best shown in Figure 2, the combustion chamber 30 may be provided with an intake port 91, a valve chamber 92 in communication with the intake port and a discharge port 93. The discharge port 93 is preferably provided with a short discharge nozzle 95 which is directed into the conical entrance 96 of an inner passage means 97 inside the previously-mentioned discharge duct 32. The cooling jacket 51 communicates with this inner passage means through its entrance 96. Thus the discharge from the combustion chamber 30 is directed by the nozzle 95 into the inner passage means 97 and the cooling air circulating through the jacket 51 enters the same inner passage to mingle with the products of combustion from the chamber. In the particular construction shown in Figure 2, the conical entrance 96 constitutes a Venturi throat that causes the combustion discharge to induce cooling flow through the jacket 51 and to prevent reversal of the cooling flow during the combustion discharge.

In Figures 1 and 3, the hot gases are utilized at a substantial distance from the combustion chamber 30, and a feature of the present embodiment is the manner in which the second cooling jacket 53 is employed for heat conservation. The inner passage 97 terminates in a second nozzle 98, and the outer wall of the discharge duct 32 is contracted to form a Venturi throat 100 in front of the second nozzle whereby the flow of mingled gases and heated air from the second nozzle induces the flow of cooling air through the second jacket 53 and prevents reversal of such flow.

It is apparent that the described sequence of nozzles directed into Venturi throats may be extended as required to provide any number of successive envelopes of cooling fluid, each of which eventually mingles with the products of combustion. An important feature of my invention is the manner in which such envelopes of cooling air eventually entering into the combustion discharge conserve heat. Heat lost by radiation is greatly reduced since the temperatures of all exterior surfaces are reduced. The usual heat losses incurred by cooling combustion chamber walls to keep the material of the walls below destructive temperatures is minimized since the heat transferred to the cooling medium is restored to or mingled with the discharge from the combustion chamber.

In my preferred construction, the intake and discharge ports of the combustion chamber 30 are controlled at least in part in response to pressure exerted by the fuel charges. Thus it is contemplated that the intake port will be opened in response to relatively low pressure and will be closed in response to relatively high pressure, while the discharge port will be closed in response to relatively low pressure and be opened in response to relatively high pressure. A valve arrangement providing the desired automatic operation is shown in Figure 2.

In the construction shown, the intake port 91 is controlled by an intake valve 101 that cooperates with a valve seat 102 at the valve chamber 92, and the discharge port 93 is controlled by a discharge valve 103 that seats against a valve seat 105. The intake valve 101 is of hollow cylindrical construction closed at one end and open at the other end to slidingly receive and support the discharge valve 103. Thus the discharge valve forms with the intake valve a small cylindrical chamber 106 that expands and contracts with operation of the two valves. Suitable yielding means is provided to urge the two valves toward their closed position, and such means may comprise a helical spring 107 mounted in compression in the small chamber 106.

The manner in which the intake valve responds to pressure from within the combustion chamber and to pressure from the supply pipe 45 will depend upon the relative areas acted upon by the two pressures, and the ratio between these two areas may be varied for different responsive effects. In the present construction, the intake valve 101 has a flared head 108, and the valve seat 102 is of corresponding conical configuration for close contact with the valve head. Preferably the intake valve is further reduced in diameter at its opposite end, thereby forming an annular shoulder 110. Thus, the intake valve is of what may be aptly termed a stepped-diameter configuration.

When the fuel pressure in the combustion chamber 30 is relatively low during the interval of time in which a fuel charge is building up in the combustion chamber, the intake valve 101 is held open by the pressure of the inflowing fuel mixture exerted in the valve chamber 92. As the pressure builds up in the combustion chamber to approach equality with the pressure in the supply pipe 45, the intake valve 101 closes. The moment at which the intake valve closes depends in part on the force exerted by the spring 107 and in part on the relative cross-sectional area of the valve acted upon by pressure from the valve chamber 92.

The concept of employing in the present combination an intake valve of the stepped-diameter configuration described is an important feature of the invention. If the effective cross-sectional areas of the intake valve acted upon, respectively, by pressure from the supply pipe 45 and pressure from the combustion chamber 30 are substantially equal, the intake valve will close when the combustion chamber reaches approximately a pressure that is less than the supply pipe pressure by the magnitude of the spring pressure. It is highly desirable, of course, to achieve maximum pressure in the fuel charge and therefore the spring acting upon the intake valve must be either a relatively light spring or a heavier spring combined with a suitable compensating expedient to offset or balance a portion of the spring pressure. In this instance, the compensating or balancing expedient is provided in the stepped-diameter configuration of the intake valve. If the effect of the intake valve spring is to cause a fuel charge to be formed, at say 2 pounds under the supply pipe charge, and the 2-pound differential is satisfactory, the stepped-diameter of the intake valve may be such as to provide substantially equal effective cross-sectional areas exposed to the combustion chamber and supply fuel, respectively. The particular intake valve 101 shown in Figure 2 provides substantially equal areas exposed to these two pressures.

If the 2-pound pressure differential is desirable but the effect of the spring, other things being equal, would be to cause a substantially greater pressure differential between the combustion chamber and the fuel supply, the stepped-diameter configuration may provide an effective cross-sectional area exposed to the fuel supply greater than the effective cross-sectional area exposed to the combustion chamber, the difference being such as to balance all but two pounds of the spring pressure. An intake valve of this type is shown in Figure 2a.

It is apparent that the control in relative effects that may be achieved by varying the degree to which the intake valve is stepped down in diameter makes it possible to use a single spring for closing both the intake valve 101 and the discharge valve 103. Thus, if a spring pressure of ten pounds is desirable for proper operation of the discharge valve but a spring pressure of only two pounds is desirable for operation of the intake valve, a ten-pound spring will be used and the intake valve will be stepped down in diameter sufficiently to balance eight pounds of spring pressure.

The reduced end of the intake valve 101 is slidingly mounted in the corresponding reduced end of the valve chamber 92, as may be seen in Figure 2, and this end of the intake valve is provided with a longitudinal extension 111 for ignition switch operation, as will be explained later. This supporting end of the intake valve may be provided with suitable sealing rings 109. For valve lubrication, the reduced end of the intake valve 101 is provided with a small port 112, which communicates with a lubrication pipe 113. It is apparent that lubricant from the pipe 113 is supplied not only to the periphery of the intake valve 101 but is also supplied to the periphery of the discharge valve 103 inside the intake valve, the small chamber 106 expanding and contracting with operation of the two valves to pump and distribute the lubricant.

When the small chamber 106 is expanded by relative movement between the intake valve and the discharge valve, lubricant is drawn into the chamber through the pipe 113, and upon subsequent contraction of the chamber by relative movement between the two valves lubricant is forced back into the pipe 113. This action insures the periodic supply of lubricant to the region of the two valves, and periodically the supplied lubricant is trapped by the opening movement of the intake valve 101 since such opening movement displaces the port 112 laterally out of communication with the pipe 113. With continued opening movement of the intake valve 101 the resilient contraction of the chamber 106 places the lubricant trapped therein under pressure, thereby forcing the lubricant to flow to the peripheries of both valves. Thus the lubricant is forced through the port 112 into the region of the rings 109 around the intake valve and is forced around the end of the discharge valve into the region of the rings 114. Sufficient lubrication will thereby be obtained for operation under normal circumstances. If desired, suitable check valves might be inserted in line 113 to increase the pumping effect of chamber 106.

The discharge valve 103 may be of hollow construction and is preferably filled with sodium compound for preventing the valve from overheating. Preferably the discharge valve is provided with sealing rings 114 for a snug fit with the surrounding intake valve 101. As best shown in Figure 2, the discharge valve 103 has a tapered portion 115 that is exposed to the pressure of the combustion chamber when the valve is in closed position. The tapered portion 115 terminates in a conical nose 117, which nose is masked or cut off from the pressure of the combustion chamber when the nose engages the valve seat 105 at the closed position of the discharge valve.

It may be readily understood that when the discharge valve 103 is in the closed position shown in Figure 2, with the nose of the valve cut off from the combustion chamber pressure, the combustion chamber pressure acting on the tapered portion 115 will tend to open the valve and will be effective to cause opening operation when an exceedingly high pressure is created by combustion of the fuel charge. Once the discharge valve is moved to its open position by the exceedingly high combustion pressure acting on its tapered portion 115, it will tend to maintain its open position over a range of much lower pressure, since the opening of the valve unmasked the valve nose to greatly increase the cross-sectional area subject to combustion chamber pressure.

It is apparent from the foregoing discussion that the two valves will operate automatically in response to pressure from the successive fuel charges. At the beginning of an operating cycle with the pressure of the combustion chamber relatively low, pressure of the fuel supply from the supply pipe 45 being greatly in excess of pressure in the combustion chamber will cause the intake valve 101 to open for the admission of fuel. When the pressure in the combustion chamber reaches or approaches equalization with the supply pressure, that is to say, when a predetermined fuel charge at predetermined pressure is accumulated within the combustion chamber 30, the intake valve 101 will be closed by the spring 107. At this point in the cycle, suitable ignition means operating in a manner hereinafter described energizes the spark plug 46 to ignite the fuel charge with consequent combustion and steep rise in the chamber pressure. The discharge valve 103 opens in response to this pressure rise, and, for the reason heretofore mentioned, stays open as the combustion chamber pressure drops, the spring 107 causing the discharge valve to close after the pressure in the combustion chamber drops substantially below the pressure in the supply pipe 45. Obviously, the fuel itself, instead of being introduced into the pressure chamber while intermingled with the air supply, may be injected separately into the chamber for ignition in any well-known manner, as for example, by the plug 46. Other means for increasing the pressure of the gas within the chamber simultaneously with, or immediately after, the closing of the intake valve 101, are, of course, within the purview of this invention.

The action of the Venturi throat 96 during the high pressure discharge of combustion gases has been described heretofore. It was pointed out that the Venturi effect promoted flow of the cooling air through the cooling jacket 51. It may now be pointed out that in the time intervals between the peaks of discharge flow of the combustion gases the Venturi effect is reversed, that is to say, whenever the flow of cooling air predominates over the discharge flow of combustion gases, the cooling air promotes the flow of combustion gases by Venturi action. As a consequence the stream of cooling air tends, by Venturi action, to scavenge the combustion chamber just prior to the closing of the discharge valve 103.

If desired, a relief valve may be provided to reduce the pressure in the combustion chamber 30 independently of the operation of the discharge valve 103. As shown in Figure 2, a relief valve 120 may be mounted on the exterior of the combustion chamber to communicate with the interior of the combustion chamber through a relief passage 121. The relief valve includes a valve member with a conical head 122 and an exposed valve stem 123. The valve stem has a knob 124 for manual opening of the valve and a spring 125 acting against the knob normally holds the valve in closed position. For remote control, a push button switch 126 may be provided in a location accessible to the pilot, the switch being adapted to close a suitable circuit, generally designated 127, for energizing a solenoid 128. In such an arrangement, the knob 124 will be made of magnetic material, while the remainder of the valve will be made of non-magnetic material so that the solenoid, in acting on the knob, may open the valve against opposition of the spring 125.

*The ignition arrangement*

Any suitable means known to the art may be employed to ignite the successive fuel charges in proper timing. I prefer to employ an ignition means that, like the intake and discharge valves, is responsive to the pressure of the successive fuel charges, and a feature of the preferred form of my invention is that this end is accomplished simply by making the ignition responsive to operation of the intake valve 101, with the ignition occurring at the instant the valve completely seats.

As shown in Figure 2, the ignition system may include a suitable timing switch, generally designated 130, so positioned on the combustion chamber that the longitudinal extension 111 of the intake valve 101 may act upon a switch arm 131, the arrangement being such that seating movement of the intake valve moves the switch arm 131 in opposition to a spring 132 from a first normal position against a stop 133 to a second position against a contact 134. Figure 2 shows three external terminals for the ignition circuit, a terminal 136 connected to the contact 134, a terminal 137 for the switch arm 131 and a terminal 138 on the combustion chamber, the latter terminal being grounded.

The remaining parts of the ignition circuit, as shown in Figure 1, include the following: a suitable electromotive source, such as a grounded battery 140; an ignition switch 141; a wire 142 to the ignition switch 73 controlled by the shutoff valve 33; a wire 143 to the ignition switch 83 controlled by the throttle valve 35; a wire 145 to the terminal 137 of the pressure-responsive timing switch 130; a wire 146 from the switch terminal 136 to one terminal of an ignition coil 147; and a wire 148 from the ignition coil to the spark plug 46.

The described ignition system is of the open circuit type in which the ignition coil 147 incorporates a magnetic vibrator (not shown) for producing rapidly successive sparks by the spark plug 46 whenever the circuit is closed by closing of the intake valve 101.

It is apparent that the addition of the pressure-responsive timing switch 130 to the two pressure-responsive valves 101 and 103 makes a complete combination for automatically carrying the operations of the combustion chamber through a complete cycle of fuel intake, fuel combustion and exhaust. It is further apparent that since the described arrangement permits ignition only when predetermined fuel charges at predetermined pressures have been built up by fuel flow into the combustion chamber, the frequency of the cycles will depend upon the rate of flow, and, therefore, the frequency of the cycles or the frequency of explosions within the combustion chamber will be governed by the position of the throttle valve 35.

*The altitude-compensating compressor*

Figures 19, 20A, 21A:
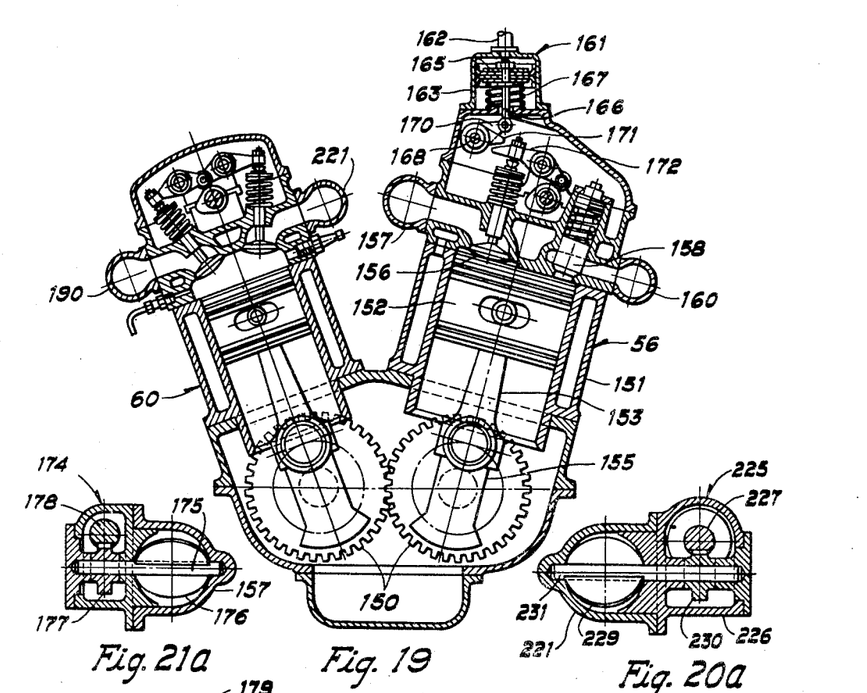
Figure 19 is a transverse section through a combined engine and compressor employed in the system, the section being taken as indicated by the line 19—19 in Figure 1.
Figure 20a is a transverse section taken along the line 20a—20a of Fig. 20.
Figure 21a is a transverse section taken along the line 21a—21a of Fig. 21.

As shown in Figure 1 and in more detail in Figure 19, the compressor 56 and the engine 60 are mounted in a V-relationship, the engine being directly connected to the compressor through a pair of gears 150. The compressor shown is of a well-known construction having a plurality of cylinders 151 in which pistons 152 are reciprocated by crank rods 153 from a crank shaft 155. In the head of the compressor are mounted poppet type intake valves 156 controlling air flow from an intake manifold 157 and spring-loaded discharge valves 158 through which the compressed air is released to a discharge manifold 160 leading to the previously-mentioned pipe 57 for supplying the air reservoir 55.

Since the engine 60 being of the internal combustion type should be free from load while being started, some suitable expedient may be employed to cause the compressor 56 to idle when desired. Since compressed air is in this instance utilized for initially energizing the engine, I may employ a valve-operating means, generally designated 161 in Figures 1 and 19, to act automatically for causing the compressor to idle whenever compressed air is released for starting the engine. For this purpose, a branch pipe 162 from the engine starter communicates with a cylindrical chamber 163 in which a suitable piston 165 is mounted to control a plunger 166. Normally a suitable helical spring 167 holds the plunger 166 in the retracted position shown in Figure 19, but whenever compressed air is employed to start the engine, the compressed air acting through the branch pipe 162 moves the piston 165 inward in opposition to the spring 167 and thereby causes the plunger to rotate a shaft 168, the plunger being connected to a rocker arm 170 on the shaft. The shaft 168 carries a number of fingers 171 that move against corresponding valve fingers 172 to hold the various intake valves 156 of the compressor open thereby causing the compressor to idle at no load. When the compressed air for starting the engine is cut off, the spring 167 becomes effective to return the piston 165 thereby causing the various intake valves 156 of the compressor to again become operative for normal compressor operation.

It is obviously desirable that a compressor employed with such an internal combustion generator on an aircraft operate efficiently to maintain the pressure of its output at all altitudes, and, in the present system maintaining the pressure of the air supply is of special importance because the combustion cycle is controlled by pressure response. It is apparent that variation in the pressure at which air is supplied to the throttle valve 35 will affect the frequency of the combustion cycles independently of the adjustment of the throttle and, since it is desirable that the combustion frequency at the various throttle settings be substantially constant at all altitudes, the pressure of the air supplied to the throttle should likewise be substantially constant.

One feature of the present embodiment of my invention is the concept of achieving substantially constant compressor output over an extensive range of altitudes by designing a compressor for the desired output at the highest contemplated altitude and equipping the compressor with a control responsive to changes in atmospheric pressure, the control acting automatically to vary the volumetric input with altitude. Other expedients to compensate for altitude changes may be employed.

Figures 20, 21, 22, 23:
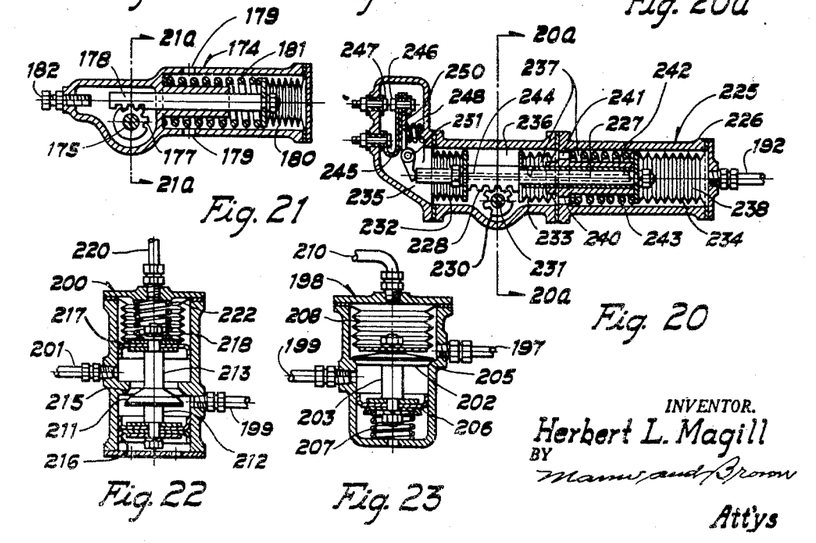
Figure 20 is a sectional view along the line 20—20 of Fig. 1, showing an engine control employed in the system.
Figure 21 is a sectional view along the line 21—21 of Fig. 1, showing a barometric control or altitude-compensating mechanism employed with the compressor in the system shown in Figure 1.
Figure 22 is a sectional view along the line 22—22 of Fig. 1, showing a vacuum-operated cutoff valve employed in the system.
Figure 23 is a sectional view along the line 23—23 of Fig. 1, showing a pressure-responsive starter valve employed in the system.

The automatic control or barometric unit for the compressor may take the form shown in Figure 21. The barometric control, generally designated 174, which has openings 179 to the atmosphere, includes a shaft 175 that extends into the intake manifold 157 of the compressor and carries a butterfly valve 176 for variably throttling the compressor intake. A gear member 177 keyed to the shaft 175 meshes with a rack member 178 that is controlled by a closed bellows 180 containing a suitable gas. Preferably a suitable helical spring 181 is employed to oppose expansion of the bellows 180 and a suitable stop screw 182 is employed for adjusting the limit position of the rack.

At relatively low altitudes, relatively high atmospheric pressure reinforced by the pressure of the spring 181 causes the bellows 180 to be relatively retracted to hold the butterfly valve in a position for relatively great impedance to air intake by the compressor. At progressively higher altitudes, the bellows progressively expands to progressively open the butterfly valve 176 for increase in the air intake. The arrangement is such that the volume of the intake for each cycle of operation of the compressor varies as required to maintain the mass or absolute quantity of air input substantially constant.

The compressor may be designed to compress the air to any desired pressure. If the heat of compression results in a temperature so high as to cause ignition of a given fuel, the compressed air may be cooled by any suitable means prior to introduction of the fuel.

*Automatic compressor engine control*

The internal combustion engine 60 for driving the compressor 56 may be of conventional construction, as indicated in Figures 1 and 19, and may directly drive the previously-mentioned fuel pump 42. A fuel pipe 183 branching from the previously-mentioned fuel pipe 43 supplies fuel to the engine carburetor 185. Preferably the engine intake is equipped with a supercharger 186 and the compressor intake is equipped with a like supercharger 187, the two superchargers being driven by a suitable turbine 188 at the end of the engine exhaust pipe 190.

The present arrangement for starting the engine 60 with compressed air includes an auxiliary air storage tank 191 that is supplied from the previously-mentioned air reservoir 55 through a pipe 192 and a branch pipe 193 equipped with a suitable check valve 194. The usual starter distributor 196 for supplying compressed air to the engine cylinders in sequence is supplied from the auxiliary tank 191 through a pipe 197, an automatic starter valve 198, a pipe 199, an automatic cutoff valve 200 and a pipe 201 from the cutoff valve to the starter distributor 196, the two valves being in series.

The automatic starter valve 198 may be of the construction shown in Figure 23 in which a valve member 202 having a stem 203 is adapted to move against a valve seat 205 to cut off communication between the two pipes 197 and 199. The valve stem 203 is attached to a piston 206 and the valve member is urged towards open position by a suitable spring 207 acting against the piston. The valve member 202 is also operatively connected to a bellows 208, the interior of which is in communication with a pipe 210, which pipe in turn communicates with the main air reservoir 55 through the previously-mentioned pipe 192.

When pressure within the air reservoir 55 drops below a predetermined point, the spring 207 acting against the weakened resistance of the bellows 208 moves the valve member 202 off its seat thereby to permit air from the pipe 197 to pass into the pipe 199 for starting the compressor engine 60. At such time, the cutoff valve 200 is open.

The cutoff valve 200 is preferably of the construction shown in Figure 22. A valve member 211 having two axial stems 212 and 213 cooperates with a seat 215 to cut off communication between the pipe 199 and thep ipe 201. The valve stem 212 is connected to a suitable piston 216 on one side of the valve seat and the valve stem 213 on the other side of the valve seat is connected both to a piston 217 and to a bellows 218. The interior of the bellows 218 is connected by a pipe 220 to the intake manifold 221 of the engine 60 so that a vacuum is maintained inside the bellows whenever the engine is in operation. It is only necessary that valve 200 seat when the engine 60 starts, inasmuch as the compressor will immediately start operating upon the seating of the valve and rapidly build up sufficient pressure to close valve 198. After then engine starts, the exhaust turbine 188 will slowly commence to move, and any rotation of the supercharger will be entirely insufficient to even commence to build up supercharging pressure. During this time the vacuum in the intake manifold 221 will act to maintain valve 200 in a seated position. It will be some time after the engine starts before the exhaust turbine 188 and supercharger 186 will develop sufficient speed to have a supercharging effect on intake manifold 221, and in the interim sufficient pressure will have been built up in reservoir 55 to maintain valve 198 in a seated position so that no air pressure will be received at valve 200. Since the effect of compressed air inside the valve is equalized by the two pistons 216 and 217, the position of the valve member 211 is determined by air pressure acting on the bellows 218 together with the pressure of a spring 222 inside the bellows urging the bellows towards its expanded position. When the engine 60 commences operation, the resulting vacuum inside the bellows 218 causes the bellows to contract in opposition to the spring 222, thereby holding the valve member 211 seated to cut off air flow to the engine starter. Whenever the engine is idle, however, substantially atmospheric pressure exists inside the bellows 218 and the spring 222 is therefore effective to force the valve member 211 to the open position shown in Figure 22.

The manner in which the starter valve 198 and the cutoff valve 200 cooperate for starting the engine 60 may be readily understood. When the engine is not in operation, a predetermined pressure exists in the air reservoir 55, the starter valve 198 is in closed position by virtue of air pressure transmitted from the air reservoir 55 and the cutoff valve is in open position by virtue of its spring 222. When the air pressure in the air reservoir 55 drops below the predetermined value, the spring 207 causes the starter valve to open, and, since the cutoff valve is already open, air is delivered to the starter distributor 196 to energize the engine. The starter distributor 196 distributes compressed air in proper timing sequence to the engine cylinders through pipes 196a; the compressed air being delivered to each cylinder at the beginning of its power stroke, this continuing until sufficient fuel is drawn into the cylinders to start the engine functioning through normal combustion of the fuel within the cylinders. As soon as the engine assumes normal operation, the consequent reduction in pressure in the bellows 218 of the cutoff valve 200 causes the cutoff valve to close.

While the engine 60 may be arranged to operate at constant speed, it is desirable to arrange for the engine to vary in speed of operation inversely with change in pressure in the air reservoir 55 over a suitable range of pressure changes. Such an additional feature is desirable to compensate for variations in the rate at which air is released from the reservoir 55 by the throttle valve 35 to meet various operating conditions.

The desired pressure-responsive speed regulator generally designated by numeral 225 in Figure 1 is connected with the air reservoir 55 through the previously-mentioned pipe 192 and may be constructed as indicated in Figure 20. Figure 20 shows a cylindrical airtight casing 226 made in three sections joined together in an airtight manner. Inside the casing 226 is a control rod 227, a portion of which is formed into a rack 228 in mesh with a gear member 230. The gear member 230 is keyed to a throttle shaft 231 which is operatively connected to the throttle of the engine 60 for regulation of the engine speed, the throttle being indicated by the dotted line 229. Movement of the control rod 227 to the right as viewed in Figure 20 increases the engine speed and vice versa.

The interior of the casing 226 is divided by three bellows 232, 233 and 234 into four chambers 235, 236, 237 and 238. The chamber 237 is spanned by a spider or wall 240 with apertures 241, the purpose of the spider being to carry a tubular member 242 for sliding support of the control rod 227. The three bellows 232, 233 and 234 are each fixedly connected to the operating rod 227 for movement therewith in unison and it will be apparent that in the course of such movement a certain amount of air leakage will occur around the throttle shaft 231. The purpose of the chamber 236 is to prevent such air leakage from affecting the control rod 227. Any pressure differential that may exist between the interior and exterior of the chamber will be neutralized by the opposed surfaces of the two bellows, 232 and 233. The interior of the bellows 238 communicates with the previously-mentioned pipe 192 from the air reservoir 55 so that pressure therein varies with the reservoir pressure. The tendency of the bellows 234 to expand in response to such air pressure is resisted by a suitable spring 243. Thus the longitudinal position of the control rod 227 will vary with pressure changes in the air reservoir 55 and will cause the engine to increase in speed as the air pressure drops.

With movement of the control rod 227, the chamber 236 and chamber 237 will be of substantially constant volume but the chamber 235 will expand or contract. Since the chamber 235 may contract or expand while the chamber 237 remains at substantially a constant volume, I provide an air passage 244 in the control rod 227 for air communication between chamber 235 and chamber 237 thereby equalizing the pressures and preventing the creation of pressure differentials that would affect the freedom of movement of the operating rod.

In my preferred arrangement, an ignition switch is placed in the chamber 235 for automatically stopping the engine whenever a predetermined pressure is attained in the air reservoir 55. In the particular arrangement shown in Figure 20, the ignition switch includes a switch arm 245 carrying a contact 246 for movement against a fixed contact 247 to close the ignition circuit. A suitable helical spring 248 maintains the switch arm 245 in closed position. A small lever 250 fulcrumed on a pivot 251 has one of its arms operatively engaged with the switch arm 245 and the other of its arms positioned in the path of movement of the control rod 227. When the predetermined pressure is attained in the air reservoir 55, the control rod 227 moves against the lever 250 thereby moving the switch arm 245 to open position for deenergizing the engine 60.

The addition of the speed regulator 225 to the system not only compensates for changes in input demand resulting from changes in position of the throttle valve 35 but also serves to minimize the decrease in the pressure of the air supply that occurs when the aircraft exceeds the altitude ceiling represented by the range of altitude compensation provided by the barometric control 174.

*Résumé of operation*

When the whole system is idle, air at normal pressure is stored both in the air reservoir 55 and in the auxiliary air storage tank 191 of the starter arrangement and both the ignition system of the internal combustion generator and the ignition system of the compressor engine are deenergized. Opening the shutoff valve 33 and opening the throttle valve 35 makes the ignition system of the internal combustion generator operative (assuming the ignition switch 141 is closed) and causes air to flow to the combustion chamber 30 through the carburetor 37 and the supply pipe 45. The flow of air through the carburetor automatically causes fuel to be released therein for mixture with the air.

A predetermined fuel charge is built up in the combustion chamber 30 within a period of time, the duration of which depends upon the rate of air flow which rate in turn depends upon the degree to which the throttle valve is opened. The pressure of the fuel mixture in the supply pipe 45 causes the intake valve to open and the intake valve closes automatically when the fuel charge reaches the predetermined quantity and pressure. In response to the closing of the intake valve, the ignition circuit is closed to ignite the charge and the resulting peak combustion pressure causes the discharge valve to open for release of the products of combustion. When the combustion chamber is substantially emptied of the hot combustion gases, the discharge valve closes automatically to permit the next succeeding fuel charge to be accumulated under pressure.

Concurrently with the supply of successive fuel charges to the combustion chamber, cooling air is circulated through the two jackets 51 and 53 to minimize radiation of heat and the heat of the cooling medium for both of the jackets is employed usefully, in this instance the cooling medium being mingled with the combustion discharge. By virtue of the described throttle arrangement the rate of flow of the cooling medium varies with the heat load, i. e., varies with the frequency of the fuel explosions.

The drop in pressure in the air reservoir 55 resulting from initiation of firing operation of the internal combustion generator causes the speed regulator 225 to open the engine throttle and close the ignition circuit of the engine and also causes the starter valve 198 to open thereby to cause the compressor engine 60 to be started by compressed air. During the period in which the compressed air is turning over the engine, the valve operating means 161 on the compressor causes the compressor to idle without imposing a load on the engine. As soon as the engine 60 begins to operate under its own power, suction from the engine intake causes the cutout valve 200 to close and the consequent cutting off of the valve operating means 161 on the compressor permits the compressor to begin normal operation for pumping air to the air reservoir 55.

Preferably the air reservoir 55 is relatively small and a feature of my invention is that saving in weight and space so desirable in aircraft may be attained by making the air reservoir 55 of small dimensions. Since the air reservoir is relatively small and the air demand by the internal combustion generator is quite substantial, the pressure in the air reservoir is highly responsive to the throttle valve 35, and, since the compressor engine 60 is in turn highly responsive to pressure drop in the air reservoir, it is apparent that the compressor engine will respond to operation of the throttle valve with no significant time lag. It is apparent then that while the throttle valve 35 controls the flow of compressed air to the internal combustion generator in a simple manner and exercises direct control only over the compressed air, nevertheless the arrangement is such that in effect the throttle valve exercises immediate control over fuel flow to the generator carburetor 37, the frequency of operation of the intake and discharge valves of the combustion chamber 30, the frequency of operation of the ignition system for the combustion chamber and the operation of the compressor engine 60. An important feature of my invention is the correlation of the various parts of the described system for the desired mode of operation in response to simple movement of the handle or throttle 48 for controlling the throttle valve 35.

*Simple applications of the generator*

The described internal combustion generator may be used in industry and elsewhere for many different purposes. Where it is desirable to position the generator at some distance from the point at which the generator discharge is to be used, a sequence of cooling jackets with a corresponding sequence of nozzles may be employed in the manner heretofore described with reference to Figures 1, 2 and 3.

If the point of use is close to the generator, the arrangement illustrated by Figure 18 may be employed. Figure 18, by way of example, shows a pressure generator employed primarily as a heating means, for example as a burner for firing a boiler. The construction is largely identical with the construction heretofore described, corresponding numerals being employed to designate corresponding parts.

In Figure 18, the discharge nozzle 95 from the combustion chamber 30 is directed into a nozzle 252 which receives heated air from the jacket 51, the nozzle 252 having the required configuration for a Venturi throat. The nozzle 252 extends through an aperture in a firebox wall 253 and is provided with a radial flange 255 by means of which the assembly is mounted on the firebox wall.

*Articulated generator*

In some applications of my invention, it is desirable to provide for controllably varying the direction in which the combustion discharge is delivered. For example, as exemplified in my copending application, Serial No. 516,258, filed December 30, 1943, the combustion discharge from my internal combustion generator may be varied in direction for the flight control of an aircraft to perform the functions of such devices as rudders, elevators and other aerodynamic controls. A suggested construction for such purpose is indicated in Figures 4, 5 and 6.

Since the combustion discharge is to be employed at a distance from the point of generation, an arrangement of combustion chamber and plurality of jackets such as disclosed in Figures 1–3 may be employed. The construction shown in Figures 4–6 is identical in many respects with the construction shown in Figures 1–3 as indicated by the use of corresponding numerals to designate corresponding parts.

The previously-described inner passage means 97 is surrounded by a discharge duct 32a corresponding to the previously-described corresponding discharge duct 32 of Figures 1–3. The discharge duct 32a is contracted to form a Venturi throat 100a into which the nozzle 98 is directed and the discharge duct 32a terminates in a nozzle 256 mounted on a universal joint for universal pivotal movement. In the construction shown, the universal joint includes a ball member 257 integral with the discharge duct 32a, the nozzle 256 having a spherical surface 258 for cooperation with the ball member. For the purpose of directional control and additionally for support of the nozzle 256, I may employ a gimbal arrangement generally designated 260 which is supported by a yoke 261 fixedly mounted on the discharge duct 32a. The gimbal arrangement includes an outer ring 262 supported from the yoke 261 by vertical trunnions 263 and an inner ring 265 having horizontal trunnions 266 supported by the outer ring 262, the inner ring being integral with the swingable discharge nozzle 256. A pair of cables 267 (Fig. 4) connected to the inner ring 265 extend to suitable control means in the cockpit for controlling the vertical components of movement of the nozzle 256 and a second pair of cables 268 (Fig. 6) are in like manner connected to the outer ring 262 whereby the pilot may control the horizontal components of motion on the part of the nozzle.

*Adapting the generator for jet-driven propeller*

Figures 13, 14, 15, 16, 17:
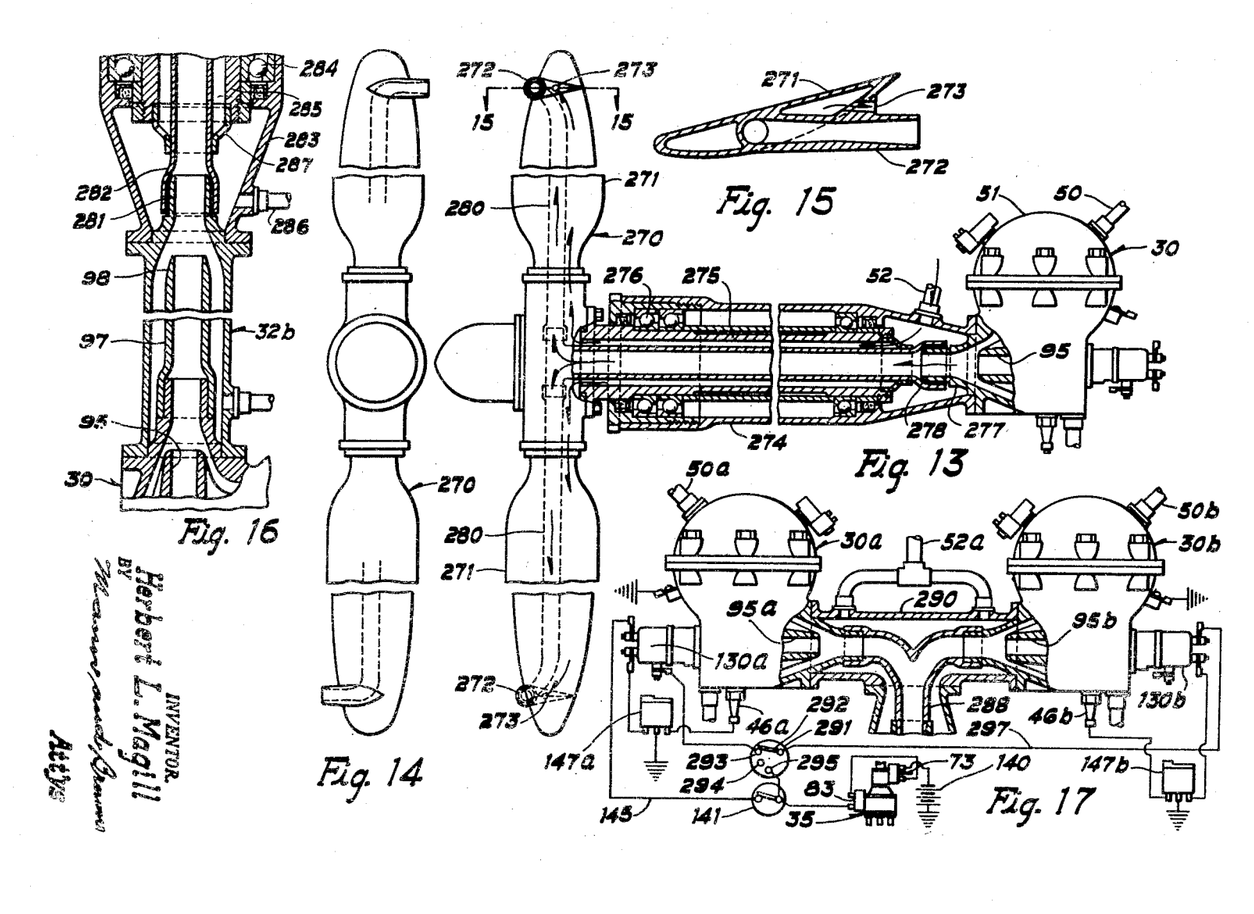
Figure 13 is a simplified view partly in side elevation and partly in section showing a pressure generator in combination with a jet-driven propeller actuated thereby.
Figure 14 is a front elevation of the jet-driven propeller of Figure 13.
Figure 15 is a section taken as indicated by the line 15—15 of Figure 13.
Figure 16 is an enlarged fragmentary sectional view indicating how the combination shown in Figure 13 may be modified in some practices of my invention.
Figure 17 is a diagrammatic view partly in side elevation and partly in section indicating the construction of a multiple-generator unit.

Figures 13–15 show how the invention may be applied to aircraft having jet-driven propellers such as disclosed in my previously-mentioned copending application. Corresponding numerals are employed to designate parts corresponding to the structure heretofore described. In Figure 13, the exhaust from the combustion chamber 30 is used to drive an airplane propeller generally designated 270 having hollow blades 271, the blades being driven by the jet or reaction discharge of the combustion gases from suitable jet nozzles 272 and auxiliary jet ports 273 on the propeller blades.

The combustion chamber 30 is directly attached to the rear end of a casing 274 that serves to support a hollow propeller shaft 275. The hollow shaft 275 which communicates with the interior of each blade 271 is mounted in a bearing 276 on the end of the casing 274 to serve in effect as a rotatable extension of the casing so that cooling air admitted to the casing 274 through the previously-mentioned pipe 52 will pass into the hollow shaft and then into the hollow blades 271 to be discharged eventually from the auxiliary jet ports 273. This auxiliary air flow is indicated by arrows in Figs. 13 and 15. It is apparent then that the casing 274 in addition to supporting the propeller has substantially the same function as the previously-mentioned discharge duct 32 in Figure 1.

The nozzle 95 from the combustion chamber 30 is directed into the throat of a nozzle 277 and the nozzle 277 telescopes with a running fit into the end of an inner passage means 278 that is carried by and rotates with the propeller 270. It is apparent that the nozzle 277 and the inner passage means 278 correspond to the previously-mentioned inner passage means 97 in Figure 1. The inner passage means 278 has branches 280 in the various propeller blades 271, which branches terminate in the jet nozzles 272.

In this particular form of the invention, the cooling air introduced by the pipe 52 into the casing 274 does not eventually mingle with the combustion discharge but, nevertheless, the energy transferred to the cooling air is employed usefully by virtue of the auxiliary jet ports 273 and serves to warm the material of the blades sufficiently to prevent formation or building up of ice on their exterior surfaces.

When the discharge from a combustion chamber is to be utilized on a rotating means at some distance from the generator, the series of successive cooling jackets heretofore discussed may be extended as desired. For example, see Figure 16 in which parts corresponding to structure heretofore described are designated by corresponding numerals. In the same manner as in Figures 1 and 3, the nozzle 95 from the combustion chamber 30 is directed to an inner passage 97, the inner passage means terminating in a nozzle 98. The inner passage means 97 is positioned in a discharge duct 32b corresponding to the discharge duct 32 of Figure 1.

The discharge duct 32b terminates in a nozzle 281 that extends with a sliding fit into the end of a rotary passage means 282 which corresponds to the inner passage means 278 of Figure 13, the inner passage means 278 leading to propeller jets, as shown in Figure 13. Fixedly mounted on the end of the discharge duct 32b is an extension 283 carrying a bearing generally designated 284 in which bearing is mounted a hollow propeller shaft 285 corresponding to the hollow shaft 275 in Fig. 13. The extension 283 is of hollow construction to receive an additional stream of cooling air through a suitable supply pipe 286 and the cooling air passes from the extension 283 through ports 287 into the annular passage in the propeller shaft 285 surrounding the inner passage means 282. This additional cooling air flowing through the hollow shaft is eventually discharged through auxiliary jet ports in the propeller blades as heretofore pointed out in Figure 13.

*Multiple generator unit*

In some practices of my invention, it is advantageous to employ a plurality of combustion chambers for a common purpose. Figure 17 shows by way of example two combustion chambers connected with common discharge means. Corresponding numerals are employed to designate parts corresponding to structure previously described.

The combustion chamber 30a and the combustion chamber 30b in Figure 17 have discharge nozzles 95a and 95b that are directed into the branches of an inner passage means 288. The inner passage means 288 and its two branches are enclosed by a T-shaped discharge duct 290. Cooling air is supplied to the discharge duct 290 by a pipe 52a having two branches as shown in Figure 17.

It is contemplated that in any such multiple-generator unit the generators will operate in sequence; that is to say, in the case of two units, will operate alternately. Any suitable means may be employed to correlate the two combustion chambers 30a and 30b in Figure 17 for alternate firing. In my preferred arrangement indicated in Figure 17, the ignition system for the two combustion chambers is designed to produce such correlation.

The combustion chamber 30a has what may be termed a first timing switch at 130a and the combustion chamber 30b has a timing switch 130b, each of which is constructed like the timing switch 130 previously described with reference to Figure 2. Such a timing switch has a low pressure position when the switch arm 131 is in its leftward position as viewed in Figure 2 and has a second high pressure position when at its rightward position.

The wiring diagram in Figure 17 includes the following elements, the counterparts of which have been previously explained in considering Figure 1: spark plugs 46a and 46b, ignition coils 147a and 147b, ignition switch 141, switch 73 associated with the shutoff valve for the air supply, switch 83 associated with the throttle valve and a battery 140. In addition, the wiring diagram includes a special switch 291 having a switch arm 292 that may be moved to any one of three contacts; namely, a contact 293 as shown in Figure 17 for causing the correlated firing of the two combustion chambers, a blank or open contact 294 for causing the combustion chamber 30a to operate alone and a contact 295 to cause the combustion chamber 30b to operate alone. When the switch arm 292 is swung to the contact 295 to cause the combustion chamber 30b to operate alone, the ignition switch 141 in Figure 17 is opened to cut the ignition chamber 30a off from the battery 140.

The correlated operation of the two combustion chambers 30a and 30b, the timing switch 130a operates in exactly the same manner as heretofore described, that is to say, in its low pressure position of the timing switch 130a, the circuit through the spark plug 46a is open and movement of the switch to its high pressure position by operation of the associated intake valve closes the circuit to energize the spark plug. The second timing switch 130b operates in the same manner but the ignition circuit for the second spark plug 46b includes not only timing switch 130b but also timing switch 130a, the switches being so wired that the circuit for energizing the second spark plug 46b is closed only when the timing switch 130b is at its high pressure position and the timing switch 130a is simultaneously at its low pressure position. Thus the spark plug 46b is energized through the following circuit: grounded battery 140, valve control switches 73 and 83, ignition switch 141, switch 130a at its low pressure position, a wire 297 from switch 130a to switch 130b, ignition coil 147b, spark plug 46b and back to ground from the combustion chamber 30b. It is apparent that the cycle of operation of the combustion chamber 30a controls the firing cycle of the combustion chamber 30b since ignition in the combustion chamber 30b can occur only when the discharge of hot gases from the combustion chamber 30a reduces the pressure therein to permit the switch 130a to take its low pressure position.

The present application is a continuation in part of my co-pending application, Serial. No. 516,258, filed December 30, 1943, which co-pending application is made a part of the present disclosure by reference.

The description in specific detail herein of preferred practices of my invention for the purpose of disclosure will suggest to those skilled in the art various changes and substitutions under my basic concepts which will fall within the scope of my appended claims.

It will be understood that in the appended claims reference to a fuel mixture "of constant volume and composition," or words of like import, of course implies some standard pressure.

I claim:

1. In a device of the character described, a combustion chamber, means for supplying a fuel mixture to said chamber under pressure to form successive charges therein having a substantially constant volume and composition, a discharge valve for the chamber, an intake valve for the chamber adapted to close in response to predetermined pressure exerted by said charges, thereby insuring said substantially constant charges, and means for varying the rate at which said mixture is supplied to said intake valve of the chamber thereby to cooperate with said intake valve to control the frequency at which said substantially constant charges are formed and exploded in the chamber.

2. In a device of the character described, a combustion chamber, means for supplying a fuel mixture to said chamber and to form substantially constant volume and pressure charges of said mixture in the chamber, means for igniting said charges, means for discharging the products of combustion from said chamber, an air jacket surrounding said chamber in communication with said discharge means, means effective to cause circulation of air through said jacket into said discharge means for cooling the walls of said chamber from the outside and for delivering to said discharge means the heat derived from such cooling, a first control means for controlling the rate at which said charges are formed and consumed by successive explosions in said chamber, and a second control means interlocked with said first control means for simultaneously controlling the rate of air circulation through said jacket whereby the cooling effect of circulated air on the outside of said chamber walls in a unit of time varies directly with the heating effect of combustion inside the chamber.

3. In a device of the character described, a combustion chamber, means for supplying a fuel mixture to said chamber and to form successive substantially constant volume and pressure charges for periodical explosion therein, means for igniting said charges, means for discharging the products of combustion from said chamber, an air jacket surrounding said chamber, means for causing a stream of air to flow through said air jacket and then mingle with the discharge from the chamber for cooling the chamber from the outside, means for controlling the frequency of the explosions in said chamber, and means responsive to said last-mentioned means for varying the rate of air flow through said jacket in accord with said frequency.

4. In a device of the character described, a combustion chamber having an intake port and a discharge port, a fuel supply passage leading to said intake port, an intake valve for controlling said intake port, a spring to urge said intake valve to closed position, said intake valve being adapted to open in response to predominance of pressure from said supply passage over pressure in the chamber and to close in response to approach to equalization of the two pressures, said intake valve having a greater effective cross-sectional area exposed to said passage pressure than to said chamber pressure to compensate in part for the pressure exerted by said spring and a discharge valve controlling said discharge port, said discharge valve being adapted to open and close in response to pressure changes in said combustion chamber, said discharge valve having a smaller effective cross-sectional area exposed to the chamber pressure when in its closed position than when in its open position, and means to ignite the successive fuel charges in said chamber.

5. In a device of the character described, a combustion chamber, a fuel supply passage to said chamber, an intake valve responsive to the differential between the pressure in said chamber and the pressure in said passage to open automatically when the chamber pressure is relatively low and to close automatically when the chamber pressure approaches the passage pressure, an exhaust valve for said chamber responsive to pressure therein for automatic action, a yielding means acting in compression between said two valves to urge both of the valves to closed position, and means to ignite the contents of the combustion chamber.

6. In a device of the character described, a combustion chamber, a fuel supply passage to said chamber, an intake valve responsive to the differential between the pressure in said chamber and the pressure in said passage to open automatically when the chamber pressure is relatively low and to close automatically when the chamber pressure approaches the passage pressure, an exhaust valve for said chamber responsive to pressure therein for automatic action, one of said valves telescoping inside the other to form a chamber that expands and contracts in response to valve operation, spring means in said chamber to urge both of the valves towards their closed positions, and means to ignite the contents of the combustion chamber.

7. In a device of the character described, a combustion chamber having an intake port and a discharge port, an intake valve controlling said intake port, and a discharge valve controlling said discharge port, one of said valves being movably telescoped inside the other to form a lubrication pump that expands and contracts with valve operation.

8. In a device of the character described, a passage means for discharging products of combustion, two combustion chambers connected with said passage for discharge thereinto, means for forming successive fuel charges under pressure in each of said chambers, and means to cause the contents of said two chambers to be ignited alternately, said ignition means including two switches corresponding to said two chambers respectively, one of said switches being movable from one position closing an ignition circuit for one of said chambers to a second position in series with the other switch for closing an ignition circuit for the other chamber.

9. In a device of the character described, a first combustion chamber, a second combustion chamber, means for forming successive fuel charges under pressure in each of said chambers, a first ignition switch for said first chamber adapted to move between a low pressure position and a high pressure position in response to changes in pressure in the operating cycle of the first chamber, a second ignition switch for said second chamber adapted to move between a low pressure position and a high pressure position in response to changes in pressure in the operating cycle of the second chamber, a first ignition circuit for said first chamber including said first switch at the high pressure position of the switch, and a second ignition circuit for said second chamber including said first switch at its low pressure position in series with said second switch at its high pressure position whereby the two switches cooperate to ignite the contents of the two chambers alternately.

10. In a combustion system of the character described for use in aircraft, a combustion chamber having intake and discharge ports, a compressed air reservoir connected with said chamber to supply a stream of compressed air thereto, means to mix fuel with said supply stream for the formation of successive fuel charges in said chamber, a throttle valve to control said supply stream, a compressor connected with said reservoir, power means to drive said compressor, means to start said power means in response to drop in pressure in said reservoir and to stop the power means in response to rise in such pressure whereby said power means starts in response to opening of said throttle valve and closes in response to closing of the throttle valve, means controlled by the pressure exerted by said charges to open and close said chamber ports automatically and to ignite the successive charges automatically whereby the frequency of the cycles of operation of said combustion chamber is controlled by the position of said throttle valve, and an automatic barometric control to vary the volume of intake by said compressor inversely with changes in the atmospheric pressure thereby to minimize pressure changes in said reservoir with changes in atmospheric pressure and in turn to minimize changes in the frequency of said firing cycles attributable to changes in altitude of the aircraft.

11. In a combustion system of the character described, a combustion chamber having intake and discharge ports, a compressed air reservoir connected with said chamber to supply a stream of compressed air thereto, means to mix fuel with said supply stream for the formation of successive fuel charges in said chamber, a throttle valve to control said supply stream, a compressor connected with said reservoir, power means to drive said compressor, means to start said power means in response to drop in pressure in said reservoir and to stop the power means in response to rise in such pressure whereby said power means starts in response to opening of said throttle valve and closes in response to closing of the throttle valve, and means controlled by the pressure exerted by said charges to open and close said chamber ports automatically and to ignite the successive charges automatically whereby the frequency of the firing cycles of said combustion chamber is controlled by the position of said throttle valve.

12. In a device of the character described for use on an aircraft to generate power by repeated combustion of constant fuel charges, a combustion chamber having intake and discharge ports, means including a power driven compressor to supply a mixture of fuel and compressed air to said chamber for the formation of successive charges therein at substantially constant volume and pressure regardless of the frequency of said charges, means controlled at least in part by the pressure of said charges to open and close said ports automatically, means to ignite said charges, means to regulate the volume intake of said compressor in inverse response to changes in atmospheric pressure thereby to minimize the variations in pressure of said fuel mixture and to minimize variations in the frequency at which said charges are formed at various altitudes of the aircraft, and means independent of said compressor and independent of said regulating means to vary the frequency of said charges.

13. In a device of the character described for use on an aircraft to generate power by repeated combustion of constant fuel charges, a combustion chamber having intake and discharge ports, means to supply a mixture of fuel and compressed air to said chamber for the formation of successive charges therein, means controlled by the pressure of said charges to open and close said ports automatically for formation of the charges at constant pressure, means to ignite said charges as fast as formed, means to regulate the operation of said supply means in compensation for changes in altitude thereby to minimize variations in the pressure at which said mixture is supplied at various altitudes of the aircraft, and means to regulate the rate at which said mixture is released to said chamber thereby to vary the frequency of said charges independently of said first-mentioned regulating means.

14. In a device of the character described for use on an aircraft to generate power by repeated combustion of constant fuel charges, a combustion chamber having intake and discharge ports, an air reservoir connected with said combustion chamber to supply compressed air thereto, means to mix fuel with the compressed air to form successive fuel charges in said chamber, means responsive to the pressure exerted by said charges to open and close said ports automatically, means to ignite said charges, a compressor for delivering compressed air to said reservoir, means to vary the quantity intake of said compressor on each cycle of operation thereof in compensation for changes in altitude thereby to minimize variations in the frequency of said charges attributable to variations in the altitude of the aircraft, and means independent of said varying means to increase the speed of operation of said compressor in response to drop in the pressure in said reservoir thereby to further minimize variations in the frequency of said charges.

15. In a device of the character described for use on an aircraft, a combustion chamber having intake and discharge ports, an air reservoir connected with said combustion chamber to supply compressed air thereto, means to mix fuel with the compressed air to form successive fuel charges in said chamber, means responsive to the pressure exerted by said charges to open and close said ports automatically, means to ignite said charges, a compressor for delivering compressed air to said reservoir, means responsive to atmospheric pressure over a given range of pressures to increase the quantity intake of said compressor on each cycle of operation in response to drop of atmospheric pressure over a given range of altitudes of the aircraft thereby to minimize variations in the pressure of said compressed air and consequent variation in frequency of said charges over said range of altitudes, and means independent of said atmospheric responsive means to increase the speed of operation of said compressor in response to drop in pressure in said reservoir thereby to minimize the drop in pressure in the reservoir attributable to increase in the rate at which compressed air is delivered from said reservoir to said combustion chamber and also to minimize the decrease in frequency of said charges when the aircraft climbs above said range of altitudes.

16. In a device of the character described, a combustion chamber, means for supplying a fuel mixture of substantially constant volume and composition to said chamber to form successive charges therein, means for causing the successive charges in the chamber to explode at substantially constant pressure thereby causing the frequency of the explosions to depend upon the rate of supply of said mixture, and means apart from said supply means and independent of the action of said chamber for variably controlling the rate of flow of said mixture from the supply means to the chamber thereby to vary the frequency of the explosions.

17. In a device of the character described, a combustion chamber, means for supplying fuel charges of substantially constant volume and composition to said chamber under pressure, an intake valve for said chamber adapted to close in response to a rise in pressure within the chamber to a predetermined magnitude, means for igniting said charges in direct response to substantially complete closing of the intake valve, a discharge valve for said chamber adapted to open in response to a higher rise in pressure therein, and means continuously urging said discharge valve to its closed position to cause the discharge valve to close in response to a drop in pressure in the chamber.

18. In a device of the character described, a pressure chamber, means for supplying a gaseous fluid and a fuel under pressure to said chamber in predetermined quantities to form in the chamber successive charges of a fuel mixture having substantially constant volume and composition, intake and discharge valves for said chamber operatively responsive to successive pressure rises therein of predetermined magnitude, whereby each of said charges reaches a given predetermined pressure in the chamber, means for igniting said charges at said predetermined pressure whereby the frequency of the formation and ignition of the charges is determined by the rate of fluid and fuel supply, and means for varying the rate of fluid and fuel supply thereby to control said frequency.

19. In a device of the character described, a pressure chamber, means for supplying a gaseous fluid and fuel under pressure to said chamber in predetermined quantities to form in the chamber successive charges of a fuel mixture of substantially constant volume and composition, means for causing the successive charges in the chamber to explode at a predetermined pressure thereby causing the frequency of the explosions to depend upon the rate of supply of said fluid and fuel to the chamber, means independent of the action of said chamber for variably controlling the rate of supply of said fluid and fuel to the chamber thereby to vary the frequency of the explosions, a discharge passage to receive the products of combustion from said chamber, an air jacket surrounding said chamber in communication with said discharge passage, and means to force air under pressure into said air jacket to cause cooling flow of the air therefrom to said discharge passage 20. In a power plant for an aircraft, a combustion chamber, an air reservoir connected with said combustion chamber to supply compressed air thereto, means to mix fuel with the compressed air to form a fuel mixture for combustion in the chamber, a compressor unit including a compressor engine to supply compressed air to said reservoir, said compressor unit having an output sufficient to maintain operation of said combustion chamber at high efficiency when the aircraft is at a high altitude, and a barometrically controlled air intake valve operatively connected to the air intake for the compressor adapted to restrict the flow of air to the compressor at low altitudes and increase the flow at higher altitudes.

21. In a power plant for an aircraft, a combustion chamber, an air reservoir connected with said combustion chamber to supply compressed air thereto, means to mix fuel with the compressed air to form a fuel mixture for combustion in said chamber, a control means to vary the rate at which the fuel mixture is supplied to the combustion chamber, a compressor unit including a compressor engine to supply compressed air to said reservoir, and means independent of said control means to vary the volume of air intake per minute of said compressor unit in response to changes in atmospheric pressure, thereby to minimize the variations in pressure in said reservoir attributable to changes in altitude of the aircraft.

22. In a power plant for an aircraft, a combustion chamber, an air reservoir connected with said combustion chamber to supply compressed air thereto, means to mix fuel with the compressed air to form a fuel mixture for combustion in said chamber, a compressor unit including a compressor engine to supply compressed air to said reservoir, means to vary the volume of air intake per minute of said compressor unit in response to changes in atmospheric pressure thereby to minimize the variations in pressure in said reservoir attributable to changes in altitude of the aircraft, and means to vary the volume intake per minute of said compressor unit in response to changes in pressure in said reservoir independent of changes in atmospheric pressure thereby to tend to maintain the reservoir pressure substantially constant.

23. In a device of the character described for use on an aircraft, a combustion chamber having intake and discharge ports, an air reservoir connected with said combustion chamber to supply compressed air thereto, means to mix fuel with the compressed air to form successive fuel charges in said chamber, means responsive to the pressure exerted by said charges to open and close said ports automatically to cause the frequency of said charges to vary with the rate at which the mixture of fuel and air is supplied to the chamber, means to ignite said charges, a compressor unit including a compressor engine to supply said reservoir, means to vary the volume intake per minute of said compressor unit in response to changes in atmospheric pressure thereby to minimize the effect of changes in altitude on said frequency, and means to vary the volume intake of said compressor unit in response to variations in pressure in said reservoir independent of atmospheric pressure to tend to maintain the reservoir pressure substantially constant over a range of changes of said frequency.

24. In a power plant for an aircraft, a combustion chamber having intake and discharge ports, a compressed air reservoir connected with said chamber to supply a stream of compressed air thereto, means to mix fuel with said supply stream for the formation of successive fuel charges of constant volume and pressure in said chamber to cause periodic explosions therein, means to control said supply stream, a compressor unit including a compressor engine to supply said reservoir, means independent of said control means to vary the volume intake per minute of said compressor unit in response to changes in atmospheric pressure thereby to minimize variations in pressure in said reservoir attributable to changes in altitude of the aircraft, and means controlled by the pressure exerted by said charges to open and close said chamber ports automatically and to ignite the successive charges automatically whereby the frequency of said explosions is governed by said control means.

25. In a power plant for an aircraft, a combustion chamber having intake and discharge ports, a compressed air reservoir connected with said chamber to supply a stream of compressed air thereto, means to mix fuel with said supply stream for the formation of successive fuel charges in said chamber to cause periodic explosions therein, means to control said supply stream, a compressor unit including a compressor engine to supply said reservoir, means to vary the volume intake per minute of said compressor unit in response to changes in atmospheric pressure thereby to minimize variations in pressure in said reservoir attributable to changes in altitude of the aircraft, means controlled by the pressure exerted by said charges to open and close said chamber ports automatically and to ignite the successive charges automatically whereby the frequency of said explosions is governed by said control means, and means to vary the volume intake per minute of said compressor unit in response to changes in pressure in said reservoir independent of changes in atmospheric pressure to tend to maintain the reservoir pressure substantially constant regardless of changes in said frequency.

26. A device of the character described, a continuous flow pressure chamber, an intermittent flow combustion chamber, means to supply said pressure chamber with a continuous flow of compressed air, means for supplying a fuel mixture to said combustion chamber to form successive charges in said chamber, means to explode said charges at substantially constant volume and pressure thereby causing the frequency of the explosions to depend upon the rate of supply of said mixture, means to vary the rate of flow of said mixture to said combustion chamber thereby to vary the frequency of explosions, said explosions resulting in the release of heat energy in said combustion chamber with an accompanying increase in the pressure of the contents of said combustion chamber, a discharge nozzle for said combustion chamber, a discharge nozzle for said pressure chamber, a discharge passage for said two chambers, said nozzles forming a venturi into said discharge passage, means to transfer heat energy resulting from said explosions in the combustion chamber to the air in said pressure chamber to thereby accelerate the flow rate thereof whereby it is discharged into said passage at a high velocity to thereby produce a reaction thrust force and to normally create a suction effect on said combustion chamber to scavenge said combustion chamber, and means to control the rate of supply of said compressed air to said pressure chamber in proportion to the frequency of the explosions and thus the rate at which heat energy is released in said combustion chamber to thereby maintain the air to heat ratio in the pressure chamber and the operating temperatures of both chambers substantially constant regardless of the frequency of the explosions in said combustion chamber.

27. In a device of the character described, a combustion chamber having intake and discharge ports, an air reservoir connected with said combustion chamber to supply compressed air thereto, means to mix fuel with the compressed air to form successive fuel charges in said chamber, means responsive to the pressure exerted by said charges to open and close said ports automatically, means to ignite said charges, a compressor for delivering compressed air to said reservoir, driving means for the compressor, control means for varying the speed of the driving means in direct relationship to the demand for compressed air, and means responsive to changes in barometric pressure to vary the air intake to said compressor, whereby the speed of the driving means is substantially unaffected by said changes in barometric pressure.

28. In a device of the character described, a pressure chamber having intake and discharge ports, a fluid reservoir connected with said chamber to supply a stream of fluid under pressure thereto for the formation of successive fluid charges in said chamber, means to increase the pressure of said fluid in said chamber by the release of heat energy therein derived from a heat energy source, means responsive to the pressure exerted by said charges to open and close said ports automatically, means to supply said fluid under pressure to said reservoir, and means responsive to changes in pressure in said reservoir for increasing the volume output of said supply means when the air reservoir pressure decreases and for decreasing the volume output of said supply means when the air reservoir pressure increases, thereby tending to maintain the reservoir pressure substantially constant.

29. In a device of the character described to generate power, a pressure chamber having intake and discharge ports, means to supply a fluid under pressure to said chamber for the formation of successive fluid charges therein, means to increase the pressure of said fluid charges in said chamber by the release of heat energy therein derived from a heat energy source, means controlled by the pressure of said charges to open and close said ports automatically for the formation of said fluid charges at constant pressure, means to regulate said supply means in compensation for changes in pressure of said fluid to minimize variation in the pressure at which said fluid is supplied to said chamber to thereby minimize variation in the pressure at which said fluid charges are formed, and means to regulate the rate at which said fluid is released to said chamber thereby to vary the frequency of said charges independently of said first regulating means.

30. In a power system of the character described, a pressure chamber having intake and discharge ports, a fluid reservoir connected with said chamber to supply a stream of fluid thereto for the formation of successive fluid charges in said chamber, means to increase the pressure of said fluid in said chamber by the release of heat energy therein derived from a heat energy source, a throttle valve to control said supply stream, a power driven means to supply said fluid under pressure to said reservoir, means to start said power means in response to drop in pressure in said reservoir and to stop said power means in response to rise in such pressure whereby said power means starts in response to opening said throttle valve and closes in response to closing the throttle valve, means controlled by the pressure exerted by said charges to open and close said chamber ports automatically whereby the frequency of the cycles of operation of said pressure chamber is controlled by the position of said throttle valve, and means to vary the output of said supply means in response to changes in pressure in said reservoir thereby to tend to maintain the reservoir pressure continuously substantially constant.

31. In a power system of the character described, a pressure chamber having intake and discharge ports, a fluid reservoir connected with said chamber to supply a stream of fluid thereto for the formation of successive fluid charges in said chamber, means to increase the pressure of said fluid in said chamber by the release of heat energy therein derived from a heat energy source, a throttle valve to control said supply stream, a power driven means to supply said fluid under pressure to said reservoir, means to start said power means in response to drop in pressure in said reservoir and to stop said power means in response to rise in such pressure whereby said power means starts in response to opening said throttle valve and closes in response to closing said throttle valve, and means controlled by the pressure exerted by said charges to open and close said chamber ports automatically whereby the frequency of the cycles of operation of said pressure chamber is controlled by the position of said throttle valve.

32. In a power plant of the character described, a combustion chamber having intake and discharge ports, a compressed air reservoir connected to said chamber to supply a stream of compressed air thereto, means to mix fuel with said supply stream for the formation of successive fuel charges of constant volume and pressure in said chamber to cause periodic explosions therein, means to control said supply stream, a compressor unit including a compressor engine to supply said reservoir, means controlled by the pressure exerted by said charges to open and close said chamber ports automatically and to ignite the successive charges automatically whereby the frequency of said explosions is governed by said control means, and means for maintaining the reservoir pressure substantially constant by varying the volumetric output of said compressor in response to changes in pressure in said reservoir.

33. In a power plant of the character described, a pressure chamber, a fluid reservoir connected with said chamber to supply a fluid under pressure thereto, means to increase the pressure of said fluid in said chamber by the release of heat energy therein derived from a heat energy source, a power driven means to supply said reservoir with fluid under pressure, a control means to vary the rate at which the fluid is supplied to the pressure chamber, and means for maintaining the reservoir pressure substantially constant by varying the volumetric output of said compressor in response to changes in pressure in said reservoir.

34. In a device of the character described, a pressure chamber, a fluid supply passage to said chamber, an intake valve responsive to the differential between the pressure in said chamber and the pressure in said passage to open automatically when the chamber pressure is relatively low and to close automatically when the chamber pressure approaches the passage pressure, an exhaust valve for said chamber responsive to pressure therein for automatic action, one of said valves telescoping inside the other to form a chamber that expands and contracts in response to valve operation, spring means in said chamber to urge both of the valves towards their closed positions, and means to increase the pressure of said fluid in the chamber by the release of heat energy therein derived from a heat energy source.

35. A device as set forth in claim 34 in which the discharge valve is telescoped within the intake valve.

36. In a power system of the character described a pressure chamber having intake and discharge ports, a fluid reservoir connected with said chamber to supply a stream of fluid thereto for the formation of successive fluid charges in said chamber, means to increase the pressure of said fluid in said chamber by the release of heat energy therein derived from a heat energy source, a throttle valve to control said supply stream, a power driven means to supply said fluid under pressure to said reservoir, means to start said power means in response to drop in pressure in said reservoir and to stop said power means in response to rise in such pressure whereby said power means starts in response to opening said throttle valve and closes in response to closing said throttle valve, means controlled by the pressure exerted by said charges to open and close said chamber ports automatically whereby the frequency of the cycles of operation of said pressure chamber is controlled by the position of said throttle valve, and a remotely controlled pressure relief valve operatively connected to said chamber.

37. In a pressure generator, a pressure chamber, means for supplying a gaseous fluid and a fuel under pressure to said chamber in predetermined quantities to form in the chamber successive charges of a fuel mixture having substantially constant volume and composition, intake and discharge valves for said chamber each operatively responsive at least in part to pressure conditions in the chamber, the intake valve being moved to closed position when the fluid in the chamber reaches a predetermined pressure and the discharge valve being moved to open position when the pressure rises a given amount above said predetermined pressure, and means for exploding said charges when substantially at said predetermined pressure, said means including a device operable in response to movement of the intake valve to substantially its closed position, whereby the charges are exploded while both intake and discharge valves are in their closed positions.

HERBERT L. MAGILL.

REFERENCES CITED

The following references are of record in the file of this patent:

UNITED STATES PATENTS

| Number | Name | Date |
|---|---|---|
| 403,294 | Schmid et al. | May 14, 1889 |
| 916,726 | Lake | Mar. 30, 1909 |
| 940,162 | Kerr | Nov. 16, 1909 |
| 982,540 | Skouses | Jan. 24, 1911 |
| 1,025,251 | Desmond | May 7, 1912 |
| 1,073,717 | Stachel | Sept. 23, 1913 |
| 1,088,761 | Anderson | Mar. 3, 1914 |
| 1,265,309 | Dunne | May 7, 1918 |
| 1,375,601 | Morize | Apr. 19, 1921 |
| 1,387,166 | Pazos-Martinez | Aug. 9, 1921 |
| 1,572,508 | Schmidt | Feb. 9, 1926 |
| 1,601,248 | Gillespie et al. | Sept. 28, 1926 |
| 2,022,900 | Pavlecka | Dec. 3, 1935 |
| 2,088,954 | Gregg | Aug. 3, 1937 |
| 2,124,462 | Cummings | July 19, 1938 |
| 2,139,284 | Rieseler | Dec. 6, 1938 |
| 2,195,025 | Couzinet | Mar. 26, 1940 |
| 2,283,863 | Achterman | May 19, 1942 |
| 2,403,398 | Reggio | July 2, 1946 |
| 2,427,284 | Jocelyn | Sept. 9, 1947 |

FOREIGN PATENTS

| Number | Country | Date |
|---|---|---|
| 261,071 | Great Britain | Nov. 8, 1926 |
| 416,030 | Great Britain | Sept. 3, 1934 |
| 14,716 | France | Nov. 18, 1911 |
|  | (Addition to No. 420,509) | |
| 560,368 | France | July 9, 1923 |
| 539,037 | Germany | Apr. 15, 1932 |